(12) United States Patent
Luyckx et al.

(10) Patent No.: US 7,771,075 B2
(45) Date of Patent: Aug. 10, 2010

(54) ELECTRONIC DEVICE FOR VEHICLES

(75) Inventors: James Joseph Luyckx, Troy, MI (US); Michael D Luyckx, Novi, MI (US)

(73) Assignee: Eastek International Corporation, Buffalo Grove, IL (US)

(*) Notice: Subject to any disclaimer, the term of this patent is extended or adjusted under 35 U.S.C. 154(b) by 225 days.

(21) Appl. No.: 12/001,683

(22) Filed: Dec. 12, 2007

(65) Prior Publication Data

US 2009/0154150 A1 Jun. 18, 2009

(51) Int. Cl.
*F21L 4/00* (2006.01)
(52) U.S. Cl. ........................ 362/183; 362/157; 362/253; 701/29; 701/115
(58) Field of Classification Search ................. 362/157, 362/183, 253; 701/29, 115
See application file for complete search history.

(56) References Cited

U.S. PATENT DOCUMENTS

| | | | |
|---|---|---|---|
| 6,832,141 B2 | 12/2004 | Skeen et al. | |
| 2004/0249557 A1* | 12/2004 | Harrington et al. | 701/115 |
| 2006/0017552 A1* | 1/2006 | Andreasen et al. | 340/438 |
| 2006/0036355 A1 | 2/2006 | Schaar et al. | |
| 2007/0073460 A1* | 3/2007 | Bertosa et al. | 701/29 |
| 2007/0135981 A1 | 6/2007 | Raichle et al. | |
| 2008/0086246 A1* | 4/2008 | Bolt et al. | 701/29 |

OTHER PUBLICATIONS

Society of Automotive Engineers, Surface Vehicle Standard, J1962, Rev. Apr. 2002.

* cited by examiner

*Primary Examiner*—Sandra L O'Shea
*Assistant Examiner*—Meghan K Dunwiddie
(74) *Attorney, Agent, or Firm*—McAndrews, Held & Malloy

(57) ABSTRACT

Certain embodiments of the present invention provide an electronic apparatus for use in a vehicle, the apparatus including: a connector further including at least two electrical connection points and a mechanical connector; an adaptation portion coupled with the connector; a housing adaptively coupled with the adaptation portion; and an electronic portion housed at least partly in the housing, the electronic portion electrically coupled with the at least two electrical connection points, wherein the adaptation portion is facilitative for orienting the housing in a plurality of positions relative to the connector. In an embodiment, the adaptation portion includes a pivot having a mechanical memory. In an embodiment, the electronic portion includes a rechargeable battery and a load connection, wherein the rechargeable battery is capable of receiving energy from a vehicle electrical system through the connector, and the rechargeable battery is capable of supplying energy to a load connected to the load connection. In an embodiment, the data link connector port includes a J1962 connector.

18 Claims, 4 Drawing Sheets 410 420

430 440

ELECTRONIC DEVICE FOR VEHICLES

BACKGROUND OF THE INVENTION

Embodiments of the present invention relate generally to electronic devices for vehicles. Particularly, certain embodiments relate to consumer electronic devices for use with a vehicle's data link connector port.

Since 1994, the Environmental Protection Agency due to the Federal Clean Air Act has mandated that all light-duty vehicles and light-duty trucks have a standardized accessible data link port. Specifically, the regulations (e.g., 40 CFR §86.094-17) require that the data link port complies the Society of Automotive Engineers (SAE) J1962 standard. SAE J1962 requires the data link port to be located in the passenger or driver's compartment. Thus, a vast quantity of vehicles manufactured since 1994 have a J1962 data link port in the passenger or driver's compartment. As used herein, the term "vehicle" applies to all cars, trucks, vans, motorcycles, etc. that have a data link port.

The J1962 port allows diagnostic tools to communicate with other components in the vehicle. The J1962 data link port enables diagnostic tools to couple to, and interact with other components through data signal lines on a vehicle bus. Vehicle busses may include J1850, ISO9141, ISO15765, ISO14230, and/or proprietary busses, for example. Diagnostic tools are available for connection to the J1962 data link port—including emissions testing tools, scan tools, PC with interface tools, and others. In addition to data signal lines, the J1962 port may have at least one positive voltage connection, and at least one ground. Thus, the J1962 port is capable of supplying power from the vehicle's battery (e.g., 12 VDC). Further, the power J1962 may be uninterrupted—e.g., even when an ignition key has disabled other electrical systems in the vehicle.

In cars and trucks, the location of the J1962 port provides convenient access from the interior of a vehicle. The J1962 port is readily accessible, even when the vehicle is in motion. Further, the interior of a vehicle protection from dirt, moisture, and temperature. The J1962 port provides access to vehicle data and power. Therefore, the J1962 port provides opportunity for devices that may be used by the owner, driver, or passenger of a vehicle.

Thus, there is a need for devices that allow consumers to benefit from the features of the J1962 port.

BRIEF SUMMARY OF THE INVENTION

Certain embodiments of the present invention provide an electronic apparatus for use in a vehicle, the apparatus including: a connector further including at least two electrical connection points and a mechanical connector; an adaptation portion coupled with the connector; a housing adaptively coupled with the adaptation portion; and an electronic portion housed at least partly in the housing, the electronic portion electrically coupled with the at least two electrical connection points, wherein the adaptation portion is facilitative for orienting the housing in a plurality of positions relative to the connector. In an embodiment, the adaptation portion includes a pivot having a mechanical memory. In an embodiment, the electronic portion includes a rechargeable battery and a load connection, wherein the rechargeable battery is capable of receiving energy from a vehicle electrical system through the connector, and the rechargeable battery is capable of supplying energy to a load connected to the load connection. In an embodiment, the apparatus further includes a switch for selectively supplying energy to the load connected to the load connection. In an embodiment, the load includes a lamp. In an embodiment, the adaptation portion is facilitative for orienting the housing with respect to the connector such that when the connector connects to a data link connector port in a vehicle, the housing substantially conforms to a contour proximate to the data link connector port. In an embodiment, the data link connector port includes a J1962 connector. In an embodiment, the apparatus further includes a microcontroller capable of diagnostically evaluating at least one other component communicatively coupled to the data link connector port. In an embodiment, the apparatus further includes a current limiting circuit for limiting a current supplied to the load.

Certain embodiments of the present invention provide a portable electronic device for use with a vehicle, the portable lighting system including: a housing; a load connection; a vehicle connector operatively coupled to the housing, the vehicle connector capable of routing energy from a vehicle electrical system of the vehicle to within the housing; a rechargeable battery at least partially housed in the housing, the rechargeable battery configurable to provide energy to a load connected to the load connection, and configurable to receive energy from the vehicle electrical system; and a control circuit at least partially housed in the housing and electrically coupled to the vehicle connector, the control circuit capable of providing energy from the vehicle electrical system to the rechargeable battery; wherein the vehicle connector is connectable to a J1962 port on the vehicle, such that the vehicle connector is capable of routing energy from the vehicle electrical system when an ignition system of the vehicle is off. In an embodiment, the system further includes a switch for selectively supplying energy from the rechargeable battery to the load. In an embodiment, the system further includes an adaptation portion facilitative for orienting the vehicle connector with respect to the housing, such that when the vehicle connector engages the J1962 port, the housing portion is capable of substantially conforming to a contour proximate to the J1962 port. In an embodiment, the adaptation portion includes a pivot having mechanical memory. In an embodiment, the load includes a lamp. In an embodiment, the housing further includes a reflector and a lens. In an embodiment, the system further includes a microcontroller capable of diagnostically evaluating other components in the vehicle connected to the data link connector port. In an embodiment, the system further includes a current limiting circuit for limiting a current supplied to the load.

Certain embodiments of the present invention provide a portable flashlight including: a housing; a lamp at least partially within the housing; a rechargeable battery at least partially within the housing, the rechargeable battery capable of supplying energy to the lamp; and a connector connected to the housing, the connector connectable with a J1962 port on a vehicle, and the connector capable of routing energy from a vehicle electrical system to the rechargeable battery. In an embodiment, the flashlight further includes a switch for selectively supplying energy to the lamp. In an embodiment, the flashlight further includes a pivot for orienting the housing with respect to the connector such that when the connector engages the J1962 port, the housing portion is capable of substantially conforming to a contour proximate to the J1962 port.

Figure 1:
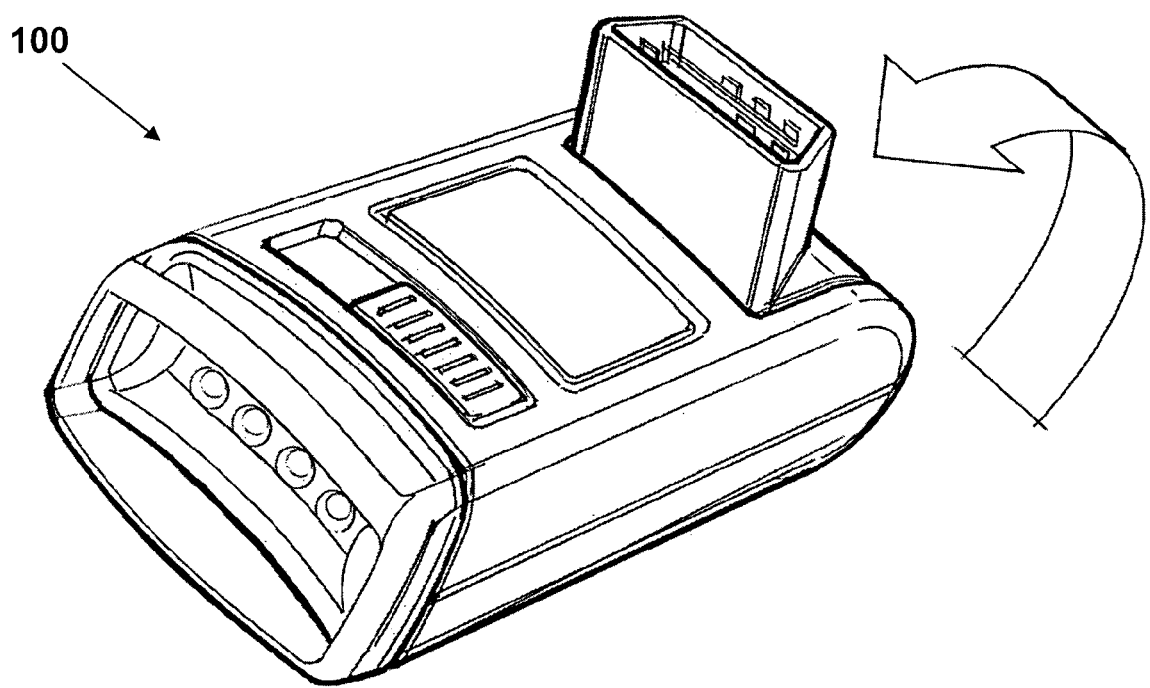
FIG. 1 shows a data link port device, in accordance with an embodiment of the present invention.

The foregoing summary, as well as the following detailed description of certain embodiments of the present application, will be better understood when read in conjunction with the appended drawings. For the purpose of illustrating the invention, certain embodiments are shown in the drawings. It should be understood, however, that the present invention is not limited to the arrangements and instrumentality shown in the attached drawings. Further, some figures may be representations of the type of display and/or output associated with methods and systems of the present invention, in accordance with one or more embodiments.

DETAILED DESCRIPTION OF THE INVENTION

Figure 2:
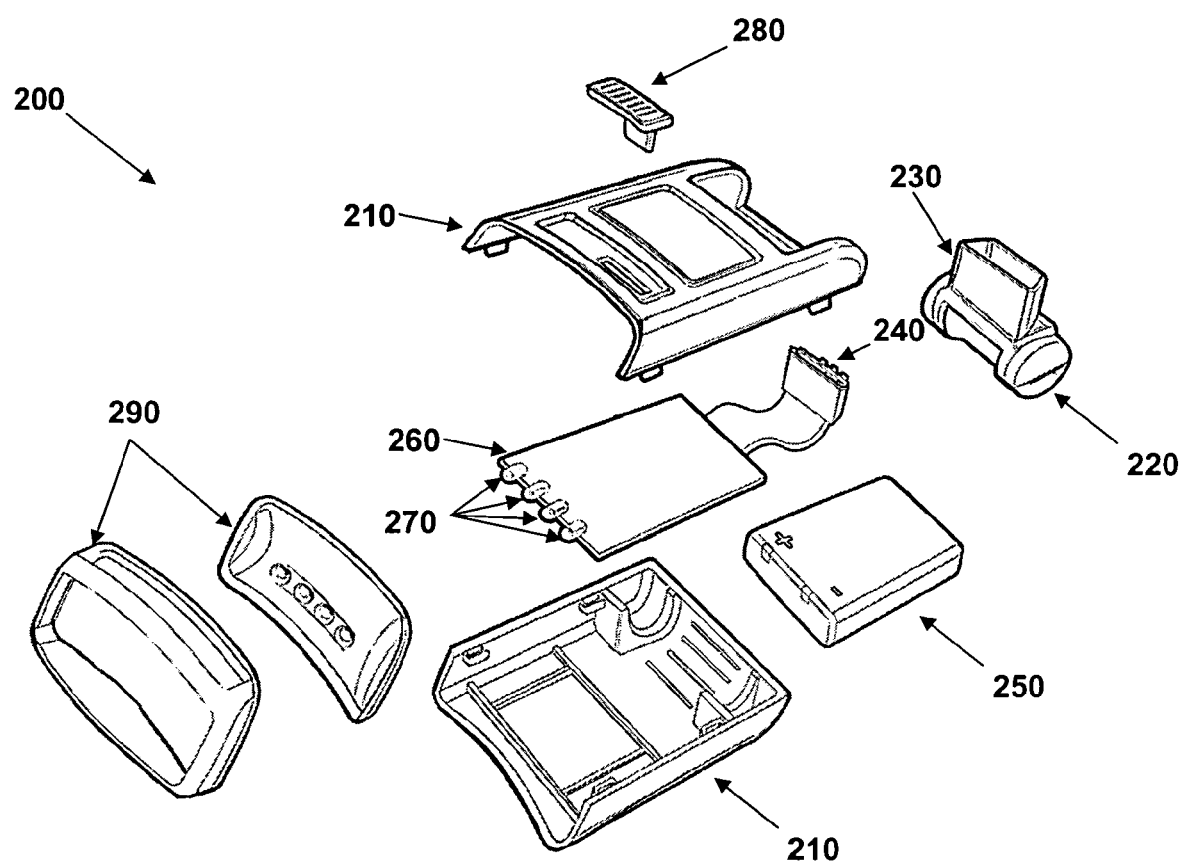
FIG. 2 shows an exploded view of a data link port device, in accordance with an embodiment of the present invention.

FIGS. 1 and 2 show a data link port device, in accordance with an embodiment of the present invention. Device 200 is depicted as having a variety of components, although certain components may be omitted for various embodiments. Device 200 may include a housing 210, an adaptation portion 220, a connector 230, a rechargeable battery 250, a circuit 260, a load 270, a switch 280, and a lens and reflector 290.

The housing 210 may be one or more portions configurable to form an interior space (or substantially interior space). For example, the housing 210 may have two or more portions that may be attached (e.g., snapped, screwed, glued, etc.) to form an overall housing 210. The interior space may be useful for housing one or more components. For example, the housing 210 may house the circuit 260, lamps 270, and/or rechargeable battery 250. The housing 210 may be appropriately sized and shaped for hand-held use by a user, although other sizes and shapes are possible as well.

The connector 230 may include a mechanical connector and/or an electrical connector. The mechanical connector may be configured to engage with a data link connector port. For example, the mechanical connector may be a female portion, capable of receiving a mating male portion (not shown in FIG. 2). The mechanical connector may conform to the standards for a J1962 data link connector, for example, although other data link connector standards may be used as well.

The electrical connector may have both mechanical and electrical aspects, as may be typical for connectors generally. The electrical connector may have electrical connection points for engaging to corresponding connection points in a data link connector port. The electrical connector may be adapted to route signals (e.g., power, ground, data, etc.) from a vehicle's data link connector port The electrical connector may electrically couple to signals, such as those provided on a vehicle bus through a J1962 data link port. The electrical connector may be configured to electrically couple to other components of the device 200 (e.g., circuit 260).

An adaptation portion 220 may facilitate orientation of the housing 210 with respect to the connector 230. The adaptation portion 220 may couple to the connector 230 and/or the housing 210. In FIGS. 1 and 2, the adaptation portion 220 is depicted as a pivot, although other options are possible. For example, an adaptation portion 220 may include a hinge, a pivot, a universal 360 degree pivot, a cable with one or more cable retentions, a flex harness, etc. An adaptation portion 220 may be flexible, or substantially flexible. The operation of the adaptation portion 220 may be influenced by other parts of the device, such as the housing 210. For example, as depicted in FIG. 2, the housing 210 is shown as having ridges that can interact with the adaptation portion 220 to effect the operation by supplying friction. The adaptation portion 220 may have "memory" such that a position of the adaptation portion 220 may be "remembered" or retained. The memory may be a result of interaction between the housing 210 and the adaptation portion 220. Thus, when a user desires to orient the housing 210 and the connector 230 with respect to each other, the adaptation portion 220 may be capable of facilitating such orientation.

The circuit 260 may be housed in housing 210, and may be electrically coupled with connection points in connector 230. The circuit 260 may be capable of electrically interacting with other components, such as the rechargeable battery 250, the switch 280, and the load 270, for example. Any combination of electrical elements, or any element by itself capable of electrical interaction may be an electrical portion. The circuit 260 may be substantially disposed on a circuit board or the like. The circuit 260 may be capable, for example, of recharging battery 250 by routing power from the vehicle's electrical system to the battery 250. The circuit 260 may also facilitate discharge of the battery 250 through load 270, for example. The circuit 260 may also interact with switch 280 to selectively supply energy to the load 270. The rechargeable battery 250 may be any portable power source that can store and discharge electrical energy—e.g., NiCd, NiMH, fuel cells, and/or the like.

The circuit 260 may include a microcontroller, microprocessor, and/or the like. The microcontroller may provide functionality to communicate with other components connected to the vehicle's data link—e.g., through a vehicle bus. It may be possible, for example, to program the microcontroller to perform various diagnostic tasks on the vehicle through communication with other components on the data link. For example, the microcontroller may facilitate the device to display the stored diagnostic codes due to the check engine light or other vehicle indication lamp diagnostic codes. The microcontroller may also be programmed to provide other types of functionality—e.g., power management, user interface display, etc.

Figure 4:
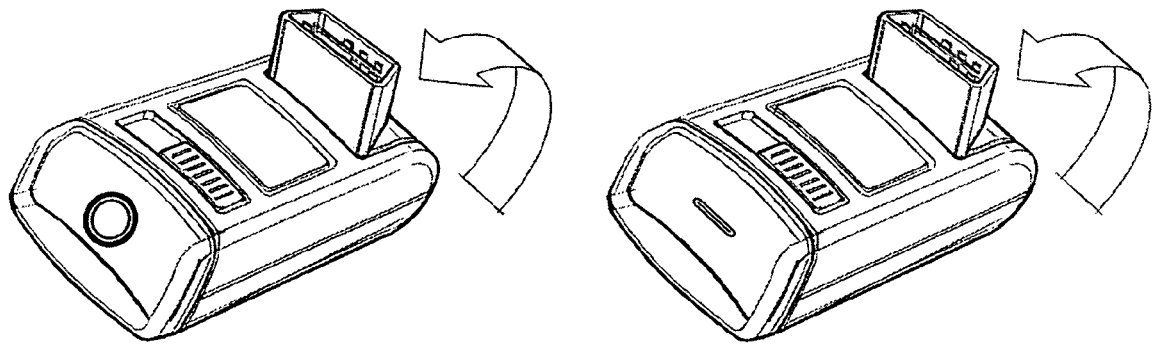
FIG. 4 shows several data link port devices, in accordance with embodiments of the present invention.
Figure 4:
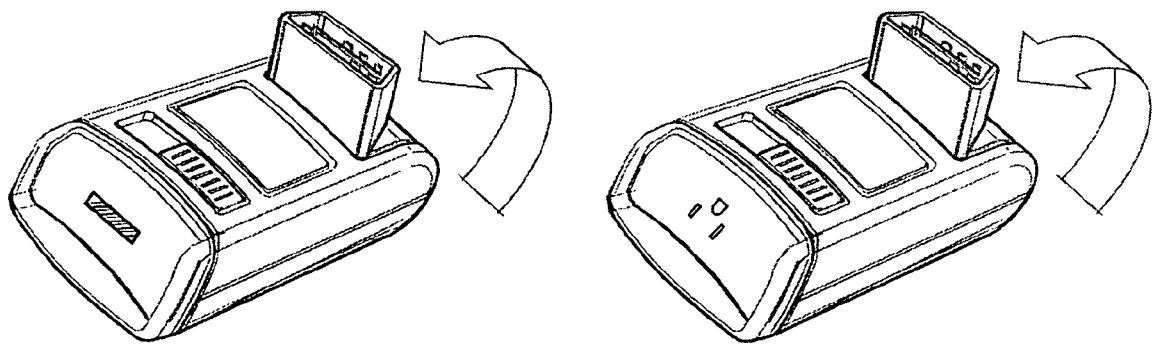

The load 270 may be any kind of electrical load. For example, the load 270 may be one or more lamps. Various types of lamps may include an LED, incandescent bulb, and/or the like. When the load 270 is a lamp, the lens and reflector 290 (or a lens or reflector independently) may be included in device 200 to enhance the effectiveness of the device 200 when used as a flashlight. The load 270 may be located outside device 200, for example. Turning for a moment to FIG. 4, several alternative embodiments—410, 420, 430, and 440—show devices having a load connection that connects to a load 270 off the device (the loads are not shown in FIG. 4). Device 410 shows an electronic apparatus having a cigarette lighter port, which may be further connected to a load. Device 420 shows an electronic apparatus having an MP3 charger port, which may be further connected to a load (e.g., MP3 player). Device 430 shows an electronic apparatus having a cell phone charger port, which may be further connected to a load (e.g., a cell phone). Device 440 shows an electronic apparatus having an AC outlet, which may be further connected to a load. In device 440, an inverter circuit may be in the housing to convert the vehicle's DC power (e.g., DC battery), to an AC power source (e.g., 110 VAC). Devices supplying energy to an external load may have a current limiting circuit to an external load to prevent blowing fuses and/or damaging the vehicle's electrical system, and components connected thereto.

The circuit 260, battery 250, and/or load 270 may be connectable to the vehicle electrical system through a data link connector port—e.g., J1962 port. The port may allow access to positive DC voltage (e.g. 12 VDC) and ground. Through voltage and ground connections, one or more of the electrical components may be able to draw energy from a vehicle's electrical system (e.g., from a 12 VDC battery). Through certain data link connector ports (e.g., J1962), electrical energy is available even when the ignition key is in the OFF position. Thus, the electrical components may be able to operate from the vehicle's electrical system even when a car is turned off. For example, the battery may recharge when other electrical systems are turned off.

The circuit 260 and/or load 270 may also draw energy directly from the battery 250 when the battery has sufficient charge. The circuit 260 and/or load 270 may selectively draw energy from either the battery 250 or the vehicle electrical system, depending on various factors, including the charge level of the battery 250 or whether the connector 230 is connected to a data link port.

Figure 3:
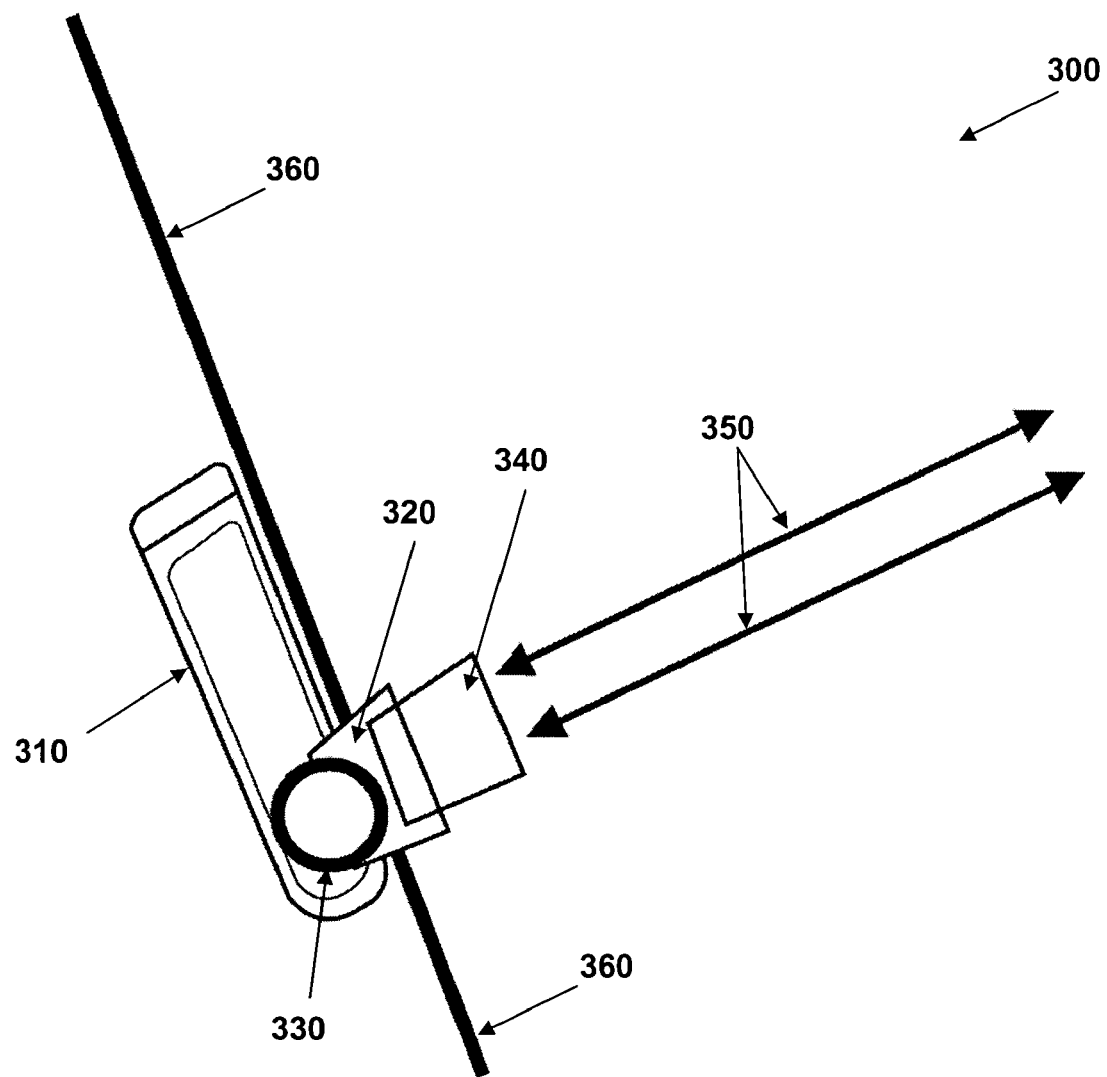
FIG. 3 shows a view of a data link port device with a data link port, in accordance with an embodiment of the present invention.

As mentioned, the adaptation portion 220 may facilitate adaptive orientation between the housing 210 and the connector 230. Turning to FIG. 3, a data link port device 300 (similar to device 200) is represented as it may be configured within a vehicle. The connector 330 may be connected to a data link connector port 340 (e.g., J1962 port). The data link connector port 340 may further be configured to route signals to/from a vehicle bus 350. A vehicle bus 350 may be part of the vehicle's electrical system, which may further include a battery, vehicle computer controllers (e.g., engine controller ECM, brake controller ABS, vehicle controller VCM, entertainment controller, etc.), vehicle Bluetooth, vehicle navigation vehicle sensors, vehicle switches, etc. The vehicle bus 350 may include a positive voltage signal (e.g., 12 VDC), a ground, and/or data signals.

Similar to the discussion with respect to FIG. 2, the connector 330 and housing 310 may couple with the adaptation portion. The adaptation portion 320 may be capable of facilitating orientation of the housing 310 in a plurality of positions relative to the connector 330. The positions may be along a rotational direction relative to the adaptation portion 320, or on other directions. As discussed, the adaptation portion 320 may have mechanical "memory." In such a case, the adaptation portion 320 may be capable of maintaining the orientation of the housing 310 relative to the connector 330.

As shown in FIG. 3, a contour 360 is proximate to the data link connector port 340. The contour 360 may correspond to various portions of a vehicle, such as, for example: driver's side underneath dashboard in the area under the steering column; driver's side, underneath dashboard between the driver-side door and steering column area; driver's side, underneath dashboard between the steering column area and the center console; driver's side dashboard instrument/gauge area between the steering column and center console; driver's side dashboard instrument/gauge area between the driver-side door and steering column; center console vertical surface (e.g., near radio and climate controls) left of vehicle centerline; center console vertical surface (e.g., near radio and climate controls) on vehicle centerline; center console vertical surface right of vehicle centerline or on passenger side of center console; center console horizontal surface (e.g., armrest, handbrake area) in front passenger area; and/or other locations (e.g., rear passenger area, passenger side glove box, top of dashboard near windshield, etc.).

When the connector 320 is connected with the data link connector port 340, the adaptation portion 320 may be capable of facilitating orientation of the housing 310 with respect to the contour 360. For example, the adaptation portion 320 may be capable of facilitating a user to orient the housing 310 to substantially conform with the contour 360. In such a position, the housing 310 may be characterized by a low profile with respect to the contour 360. Of course, the degree of conformity between the housing 310 and the contour 360 will vary while still being substantial. For example, the housing 310 can have various profiles, and the contour 360 may have various profiles. Within the limitations of the profiles, the adaptation portion may facilitate substantially conforming orientations between the housing 310 and the contour 360.

As an illustration, a data link port device may be used in the following manner. For this illustration, the device depicted in FIG. 2 will serve as the reference. A user of the data link port device 200 owns two vehicles, each of which has a J1962 data link port that routes signals from a vehicle bus. The vehicles both have a contour proximate to the J1962 port, but each contour has a different profile.

When the user receives the device 200, the battery 250 is uncharged. In the first vehicle, the user connects the device to the J1962 port. The connection is made through the connector 230. Once connected, the circuit 260 is powered by the vehicle's 12 VDC power, as provided via the J1962 connector vehicle battery voltage and vehicle ground. The circuit 260 recharges battery 250 by selectively allowing charge to flow to the battery 250.

Once the device is connected, the user applies pressure to the housing 210, and the adaptation portion 220 facilitates the orientation of the housing 210 with respect to the connector 230. Since the connector 230 is connected to the J1962 port, the housing is oriented relative to the J1962 port, and the paneling proximate to the J1962 port. The user orients the housing 210 so that it lies against the contour, thereby substantially conforming to the contour. The adaptation portion 220 has mechanical "memory" and, thus, the housing 210 remains lying against the contour until a further user interaction.

After the battery 250 has been charged (fully or partially), the user removes the device 200 from the J1962 port. The battery 250 now provides the electrical energy to power the circuit 260. The user then activates switch 280 to the ON position. The change in switch position causes the circuit 260 to allow current to flow through the load 270—in this case the load 270 is LEDs. The user then switches the switch 280 to the OFF position to cease flow of current to the LEDs.

The user then takes the device 200 to the second vehicle, and connects the device 200 to the J1962 port in the second vehicle. Again, the circuit 260 charges the battery 250. The second vehicle has paneling that has a different profile than the first vehicle. The user adjusts the orientation of the housing 210 so that it lies against the second contour. Thus, the adaptation portion 220 facilitates the orientation of the housing 210 to substantially conform to the contours in various vehicles.

Thus, embodiments of the present invention provide devices that allow consumers to benefit from the features of the J1962 port.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. For example, various data link port connectors may be employed. Therefore, it is intended that the invention not be limited to the particular embodiment disclosed, but that the invention will include all embodiments falling within the scope of the appended claims.

The invention claimed is:

1. An electronic apparatus for use in a vehicle, said apparatus comprising:
   a connector further comprising at least two electrical connection points and a mechanical connector;
   an adaptation portion coupled with said connector;
   a housing adaptively coupled with said adaptation portion; and
   an electronic portion housed at least partly in said housing, said electronic portion electrically coupled with said at least two electrical connection points,
   wherein said adaptation portion is facilitative for orienting the housing in a plurality of positions relative to said connector.

2. The apparatus of claim 1, wherein said adaptation portion comprises a pivot having a mechanical memory.

3. The apparatus of claim 1, wherein said electronic portion comprises a rechargeable battery and a load connection, wherein said rechargeable battery is capable of receiving energy from a vehicle electrical system through said connector, and said rechargeable battery is capable of supplying energy to a load connected to said load connection.

4. The apparatus of claim 3 further comprising a switch for selectively supplying energy to said load connected to said load connection.

5. The apparatus of claim 4, wherein said load comprises a lamp.

6. The apparatus of claim 1, wherein said adaptation portion is facilitative for orienting said housing with respect to said connector such that when said connector connects to a data link connector port in a vehicle, said housing substantially conforms to a contour proximate to said data link connector port.

7. The apparatus of claim 1, wherein said data link connector port comprises a J1962 connector.

8. The apparatus of claim 1 further comprising a microcontroller capable of diagnostically evaluating at least one other component communicatively coupled to said data link connector port.

9. The apparatus of claim 3 further comprising a current limiting circuit for limiting a current supplied to said load.

10. A portable electronic device for use with a vehicle, said portable lighting system comprising:
    a housing;
    a load connection;
    a lamp;
    a lens and a reflector configured to enhance the effectiveness of said lamp;
    a vehicle connector operatively coupled to said housing, said vehicle connector capable of routing energy from a vehicle electrical system of the vehicle to within said housing;
    a rechargeable battery at least partially housed in said housing, said rechargeable battery configurable to provide energy to a lamp connected to said load connection, and configurable to receive energy from said vehicle electrical system; and
    a control circuit at least partially housed in said housing and electrically coupled to said vehicle connector, said control circuit capable of providing energy from said vehicle electrical system to said rechargeable battery;
    wherein said vehicle connector is connectable to a J1962 port on the vehicle, such that said vehicle connector is capable of routing energy from said vehicle electrical system when an ignition system of the vehicle is off.

11. The system of claim 10 further comprising a switch for selectively supplying energy from said rechargeable battery to said lamp.

12. The system of claim 10 further comprising an adaptation portion facilitative for orienting said vehicle connector in a plurality of positions with respect to said housing, such that when said vehicle connector engages said J1962 port, said housing portion is capable of substantially conforming to a contour proximate to said J1962 port.

13. The system of claim 12, wherein said adaptation portion comprises a pivot having mechanical memory.

14. The system of claim 10 further comprising a microcontroller capable of diagnostically evaluating other components in the vehicle connected to said data link connector port.

15. The system of claim 10 further comprising a current limiting circuit for limiting a current supplied to said lamp.

16. A portable flashlight comprising:
    a housing;
    a lamp;
    a lens and a reflector configured to enhance the effectiveness of said lamp;
    a rechargeable battery at least partially within said housing, said rechargeable battery capable of supplying energy to said lamp; and
    a connector connected to said housing, said connector connectable with a J1962 port on a vehicle, and said connector capable of routing energy from a vehicle electrical system to said rechargeable battery.

17. The flashlight of claim 16 further comprising a switch for selectively supplying energy to said lamp.

18. The flashlight of claim 16 further comprising a pivot for orienting said housing with respect to said connector such that when said connector engages said J1962 port, said housing portion is capable of substantially conforming to a contour proximate to said J1962 port.

* * * * *

UNITED STATES PATENT AND TRADEMARK OFFICE
CERTIFICATE OF CORRECTION

PATENT NO. : 7,771,075 B2  Page 1 of 1
APPLICATION NO. : 12/001683
DATED : August 10, 2010
INVENTOR(S) : James Joseph Luyckx et al.

It is certified that error appears in the above-identified patent and that said Letters Patent is hereby corrected as shown below:

Title Page, Item [73]
On the face of the patent and in the Assignee block (INID code "73"), please delete "Eastek International Corporation, Buffalo Grove, IL (US)" and substitute "None".

Signed and Sealed this

Fifth Day of October, 2010

David J. Kappos
*Director of the United States Patent and Trademark Office*